Aug. 22, 1933.    T. B. RYON    1,923,165
TRIPLE GAS CONTROL VALVE
Filed March 29, 1930    2 Sheets-Sheet 1
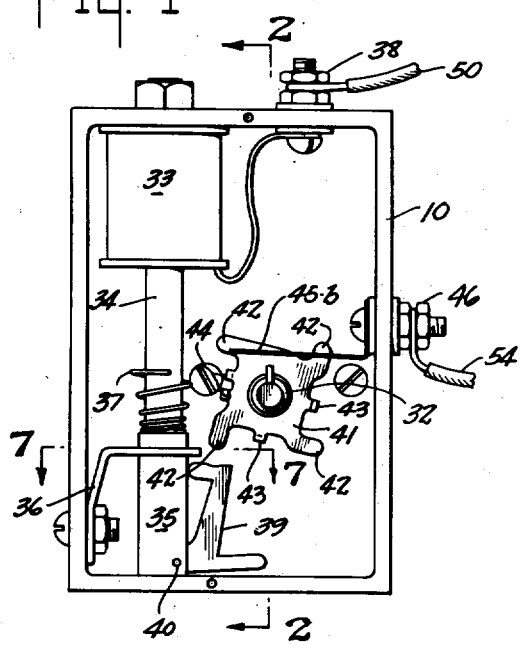
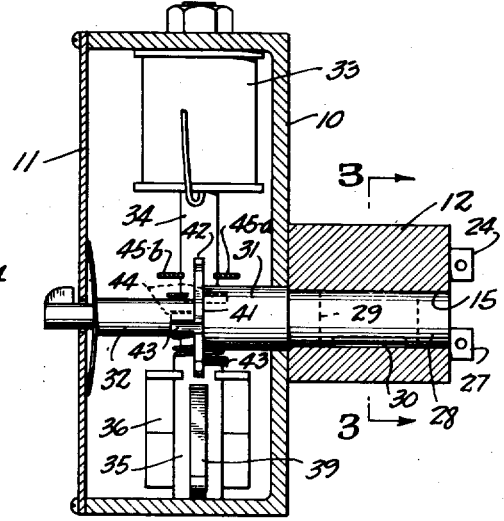
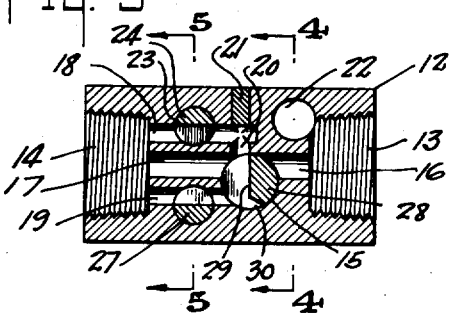
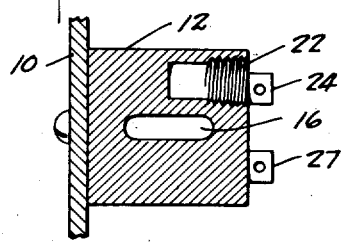
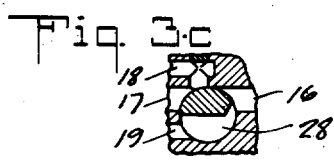
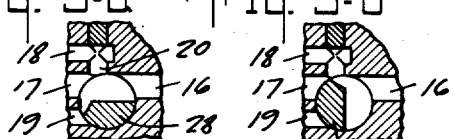
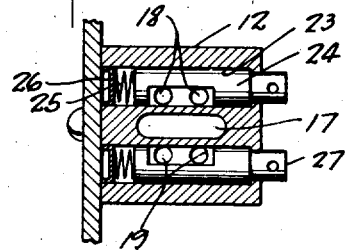
INVENTOR
Tracy B. Ryon
BY Westall and Wallace
ATTORNEYS

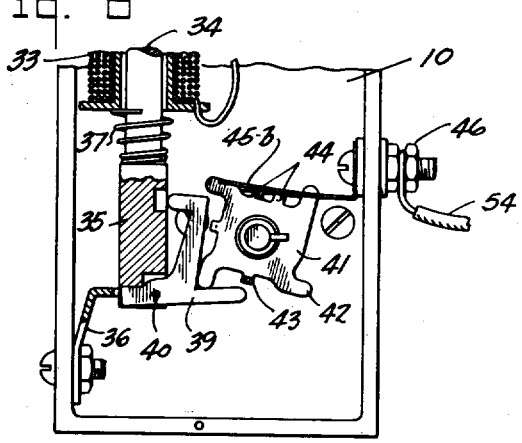
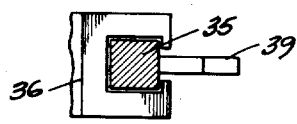
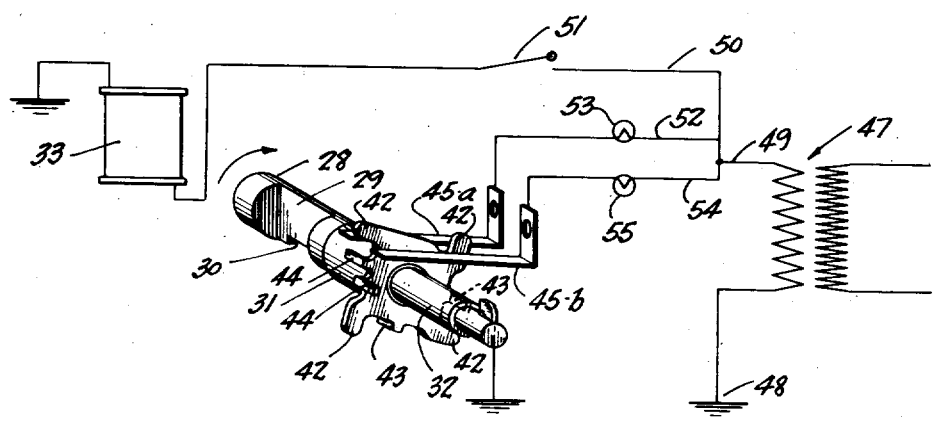

Patented Aug. 22, 1933

1,923,165

UNITED STATES PATENT OFFICE 1,923,165

TRIPLE GAS CONTROL VALVE

Tracy B. Ryon, Pasadena, Calif.

Application March 29, 1930. Serial No. 440,140

10 Claims. (Cl. 137—139)

The present invention relates to a gas control valve which may be employed to control the flow of gas to any gas consuming device, such as a burner, but is particularly applicable to building heating plants, wherein a furnace includes a gas burner. Devices of this character are known in which a gas valve is remotely controlled from a single electric switch such that by successive closures of the switch, the valve is advanced to pass gas at different rates of flow. Thus, the amount of heat developed by a burner is discontinuously controlled. In such systems, it is desirable to have a signal to indicate to the operator the position of the valve. The present invention relates to such a valve structure having a rotary valve and a novel signal and control associated therewith.

The objects of this invention are to provide a gas control valve structure having any or all of the following features: a valve casing having an inlet at one end and an outlet at the other end with a plug socket extending through the casing intermediate the inlet and outlet, a plurality of ports peripherally disposed about said socket for communication therewith, a main rotatable plug in said socket having a cut away section for registration with said ports whereby said plug may be angularly disposed either to block the inlet port or to open said inlet port to said recess and place the recess in communication with the outlet ports in seriatim; adjustable means to control the flow of gas through passages having the outlet ports; and electromechanical mechanism to move said plug step by step including a pawl and a toothed wheel which is a single unit serving both as a ratchet wheel and as a contact wheel for an electric signal circuit to indicate the position of the plug; and details of structure contributing to economy of manufacture, compactness and simplicity.

These objects together with other objects and corresponding accomplishments are obtained by means of the embodiment of my invention illustrated in the accompanying drawings, in which:—

Fig. 1 is a front elevation of the gas burner control, with the cover plate for the housing removed; Fig. 2 is a section as seen on the line 2—2 of Fig. 1; Fig. 3 is a section as seen on the line 3—3 of Fig. 2; Figs. 3a, 3b and 3c are fragmentary views similar to Fig. 3 showing other progressive positions of the valve plug; Figs. 4 and 5 are sections as seen on the line correspondingly numbered in Fig. 3; Fig. 6 is a section through a fragment of the electromechanical mechanism; Fig. 7 is a section as seen on the line 7—7 of Fig. 1; and Fig. 8 is a schematic view showing the wiring of the system.

Referring more particularly to the drawings, 10 denotes a box like housing preferably of metal and open at the front for a cover plate 11 which may be attached thereto by screws. Secured to the rear wall of the housing is a block 12 forming a valve casing. The opposite ends of the block are bored and threaded to provide an inlet 13 and an outlet 14. A bore 15 extends transversely across the block intermediate the inlet and outlet. A passage 16 elongated in cross section extends from the inlet 13 to the socket bore 15 with the lower wall thereof shown disposed in a line with the diameter of the socket. In alinement with the passage 16 is an intermediate outlet passage 17 of substantially the same cross-sectional area as passage 16 and placing the socket bore and the outlet in communication. A pair of first outlet passages 18 parallel to outlet passage 17 and are disposed above the latter. A pair of second outlet passages 19 parallel the passage 17. It will be noted that the second outlet passages 19 communicate through ports directly with the socket bore 15. The first outlet ports 18 communicate with the socket bore through ports 20 which may be conveniently formed by boring through the passages 18 into the socket bore and inserting plugs in the block as indicated by 21. A bore 22 tapped at the outer end communicates with the inlet 13 and serves for connection thereto of a pilot light line. Passages 18 are intersected by a bore 23 in which an adjustable plug 24 is mounted. It will be noted that the outer end of bore 23 is reduced in diameter to form a shoulder. Adjustment plug 24 is inserted in the bore from the inner side of the block and held in position by a compression spring 25 and a seat disk 26 which rests against the wall 10 of the housing. A bore similar to bore 23 intersects passages 19 and is provided with an adjustment plug 27. Plugs 24 and 27 are similar in construction and have a cut away section for registration with the passages, so that by turning the plugs, the flow of fluid through the passages may be adjusted. The adjustment plugs are provided with heads for convenient manipulation of the plugs.

Mounted in the socket bore 15 is a main plug 28. The plug is cut away as indicated by 29 to form a half round recess and is chamfered at one edge as indicated by 30. The plug 28 which is preferably of metal has an enlarged section 31 and a reduced section 32 forming a stem. The main plug construction is such that in the position shown in Fig. 3, the port of the inlet passage 16 is blocked and gas cannot pass through the valve casing. However, the pilot is at all times in free communication with the inlet through opening 22. By rotating the plug 28 through ninety degrees in a clockwise direction, the position shown in Fig. 3a is attained, the inlet passage 16 being placed in communication with the recess 29 and all outlet passages being open. Gas can pass from the inlet by way of all passages to the outlet 14 and thence to the burner or other gas consuming device. By turning the plug 28 to the position shown in Fig. 3b, both the intermediate passage 17 and the second outlet passages are blocked, while the first outlet passages are placed in communication with the recess 29 and with the inlet passage 16 by way of the port 20 and the chamfered edge 30. When the valve plug is turned to the position shown in Fig. 3c, the inlet passage 16 communicates with the recess 29 through the chamfered edge 30, and the recess 29 communicates with the second outlet passages 19. When the valve is rotated step by step through ninety degrees in a clockwise direction, inlet passage 16 is first placed in communication with all outlet passages. The next successive position places the inlet passage 16 in communication with the first outlet passages 18; the next position of the valve 28 places the second outlet passages 19 in communication with the inlet passage 16; and the next position of the valve plug 28 restores the latter to a position blocking the inlet passage 16. By progressively rotating the valve step by step through ninety degrees from the position shown in Fig. 3, first the maximum amount of gas may pass from inlet to outlet. This is reduced in the next position of the valve by reason of cutting off the intermediate passage and allowing gas to pass only through the first outlet passages 18. The next succeeding position of the valve retains the intermediate passage 17 closed, closes the first outlet passages 18 and opens the second outlet passages 19 to the inlet. By adjusting the plugs 24 and 27, the amount of gas which passes through the passages 19 may be made less than that which passes through passages 18. Thus, the gas may be caused by rotation of the valve to flow at a maximum rate, then being reduced in the next position, further reduced in the third position and finally shut off. It is obvious that the construction of the valve casing is such as to simplify the machining operations.

The step by step mechanism comprises a solenoid 33 in which a plunger 34 is slidably received. This plunger tends to gravitatively remain in its lower position and is provided with a head 35 guide by a slotted bracket 36 attached to the housing. The head will rest against the bottom of the housing when the solenoid is to be energized. Upon energization of the solenoid, the plunger will be raised and spring 37 serves as a shock coil resting upon the head 34 and in its upper position engaging the lower face of the solenoid. One terminal of the solenoid is grounded to the housing and the other leads to a terminal post 38, which is mounted upon the housing by suitable installation. A pawl 39 is pinned to the head as indicated by 40. Mounted upon the stem 32 is a toothed wheel 41 resting against the shoulder formed by the enlargement 31 and pinned in position thereon. Toothed wheel 41 is preferably formed of a single piece of metal having stamped therefrom four ratchet teeth 42 for the pawl 39 to engage. Bent laterally in opposite directions are contact teeth 43 disposed intermediate the ratchet teeth 42. A pair of contact teeth 44 extending laterally in opposite directions is disposed between two contiguous ratchet teeth. Extending from a side wall of the housing are brush contacts 45a and 45b straddling the toothed wheel and disposed to be engaged by the contact teeth 43 and 44. The brush contacts are insulated from the housing and are connected to separate terminal posts 46.

Referring to Fig. 8, a transformer 47 having its primary connected to a source of power is employed to supply energy for the operation of the signal and the electromechanical step by step mechanism. The secondary has one terminal grounded as indicated by 48. The other terminal 49 has a branch lead 50 connected to the terminal post 38 of the solenoid and interposed in the branch line is a switch 51 which may be a push button. Another branch line 52 is connected to a terminal post 46 leading to brush contact 45a. In this branch is a signal light 53 which is preferably of a color such as red. A third branch line 54 is connected through terminal post 46 with the other brush contact 45b and has a signal light 55 which may be conveniently of white color. In the position shown in Fig. 8, none of the contact teeth are in engagement with the brushes, and the signal light would be extinguished. Closing the switch 51 would cause the plug valve 28 to be advanced ninety degrees. In the position of the parts shown in Fig. 8, the plug valve closes the inlet of the valve casing and no gas flows. In the second position of the valve just described, the pair of contact teeth 44 engage the contact brushes 45a and 45b and both lights 53 and 55 are illuminated. In this position, the valve is in the position indicated in Fig. 3a with a maximum amount of gas flowing from inlet to outlet. Another closure of the switch 51 will cause the valve plug to be rotated through another ninety degrees to the position shown in Fig. 3b. In this position a contact tooth 43 engages the contact brush 45a and illuminates the red light 53 extinguishing light 55. In this position, the flow of gas has been reduced. Another closure of the switch 51 will cause a further ninety degrees advance of the valve plug to the position shown in Fig. 3c with the minimum amount of gas flowing, and with a contact tooth 43 engaging contact brush 45b and causing the illumination of light 55 and the extinguishing of light 53. A final closure of the switch restores the parts to the position shown in Fig. 8 with both lights extinguished and the valve closed.

What I claim is:—

1. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, three outlet ports circumferentially disposed in a row about said socket for communication between said socket and outlet, there being an intermediate port and a first outer port and a second outer port, an inlet port between said inlet and bore of said socket alined with the intermediate port, a main rotatable plug in said socket having a cut away section to form a recess for successive registration with said ports whereby said plug may be angularly disposed either to block said inlet port; to open said inlet port to said recess and to all the outlet ports; to open said inlet port to said recess, block said intermediate port and the second outer port and place the first port in communication with said inlet port; or to block the intermediate port and the first outer port and place the second outer port in communication with said recess.

2. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, three outlet ports peripherally disposed in a row about said socket for communication between said socket and outlet, there being an intermediate port and a first outer port and a second outer port, an inlet port between said inlet and bore of said socket aligned with the intermediate port adjustable means to control the flow of gas through the outer ports, a main rotatable plug in said socket having a cut away section to form a recess for registration with said ports and having a chamfered edge, whereby said plug may be angularly disposed either to block said inlet port; to open said inlet port to said recess and to all said outlet ports; to open said inlet port to said recess, block said intermediate port and the second port and place the first outer port in communication with said inlet port by way of said chamfered edge; or to block the intermediate port and the first outer port and place the second outer port in communication with said recess by way of said chamfered edge.

3. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, passages between said socket and outlet having three outlet ports peripherally disposed in a row about said socket for communication therewith, there being an intermediate port and a first outer port and a second outer port, an inlet port between said inlet and said socket alined with the intermediate port, adjustable plugs to control the flow of gas through the passages having the outer ports, a main rotatable plug in said socket having a cut away section to form a half round recess for registration with said ports and having a chamfered edge, whereby said plug may be angularly disposed either to block said inlet port; to open said inlet port to said recess and to all said outlet ports; to open said inlet port to said recess, block said intermediate and the second outer port and place the first outer port in communication with said inlet port by way of said chamfered edge; or to block the intermediate port and the first outer port and place the second outer port in communication with said recess by way of said chamfered edge.

4. In a gas burner control valve structure: a rotary valve comprising a casing of block form bored to provide an inlet at one end and an outlet at the other end with a plug socket extending through the block intermediate said inlet and outlet, said socket having its axis transverse to the path of flow of gas between said inlet and outlet, three passages in a row between said socket and outlet having ports peripherally disposed in a row about said socket for communication therewith, there being an intermediate port and a first outer port and a second outer port, an inlet port between said inlet and said socket alined with the intermediate port, a bore for each of said outer passages extending from the exterior of the block and intersecting an outer passage, adjustable plugs in said bores to control the flow of gas through the passages having the outer ports, a main rotatable plug in said socket having a cut away section to form a half round recess for registration with said ports and having a chamfered edge, whereby said plug may be angularly disposed either to block said inlet port; to open said inlet port to said recess and to said intermediate port and both said outer ports; to open said inlet port to said recess, block said intermediate port and the second outer port and place the first outer port in communication with said inlet port by way of said chamfered edge; or to block the intermediate port and the first outer port and place the second outer port in communication with said recess by way of said chamfered edge.

5. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, three outlet ports peripherally disposed in a row about said socket for communication between said socket and outlet, there being an intermediate port and a first outer port and a second outer port, an inlet port between said inlet and bore of said socket alined with the intermediate port, a main rotatable plug in said socket having a cut away section to form a recess for registration with said ports and having a chamfered edge, whereby said plug may be angularly disposed either to block said inlet port; to open said inlet port to said recess and to all said outlet ports; to open said inlet port to said recess, block said intermediate port and the second outer port and place the first outer port in communication with said inlet port by way of said chamfered edge; or to block the intermediate port and the first outer port and place the second outer port in communication with said recess by way of said chamfered edge.

6. In a gas burner control valve structure: a rotary valve comprising a casing of block form bored to provide an inlet at one end and an outlet at the other end with a plug socket extending through the block intermediate said inlet and outlet, said socket having its axis transverse to the path of flow of gas between said inlet and outlet, three passages in a row between said socket and outlet having outlet ports peripherally disposed in a row about said socket for communication therewith, there being an intermediate port and a first outer port and a second outer port, an inlet port between said inlet and said socket alined with the intermediate port, a main rotatable plug in said socket having a cut away section to form a half round recess for registration with said ports and having a chamfered edge, whereby said plug may be angularly disposed either to block said inlet port; to open said inlet port to said recess and to all said outlet ports; to open said inlet port to said recess, block said intermediate port and the second outer port and place the first outer port in communication with said inlet port by way of said chamfered edge; or to block the intermediate port and the first outer port and place the second outer port in communication with said recess by way of said chamfered edge.

7. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, a plurality of outlet ports circumferentially disposed about the bore of said socket for communication between said socket and outlet, an inlet port between said inlet and bore of said socket, a main rotatable plug in said socket having a recess for registration with said ports, whereby said plug may be angularly disposed either to block said inlet port or to open said inlet port to said recess and progressively place said outlet ports in communication with said recess and thereby with said inlet; an electromechanical step by step mechanism for rotating said main plug comprising a stem having a toothed wheel of metal with four ratchet teeth extending radially, and two single contact teeth extending laterally in opposite directions and disposed between successive ratchet teeth and a pair of contact teeth extending laterally in opposite directions disposed intermediate succeeding ratchet teeth so that said single contact teeth and said pair of contact teeth will be advanced in seriatim, a reciprocable plunger and pawl engaging said ratchet teeth, an electromagnetic device to move said plunger, a pair of brush contacts disposed on opposite sides of said wheel for engagement by said contact teeth, said wheel being electrically connected to one electrical terminal and each of said brush contacts being electrically connected to separate terminals.

8. In a gas burner control valve structure: a rotary valve comprising a casing having an inlet at one end and an outlet at the other end with a plug socket intermediate said inlet and outlet, said socket having its axis transverse to the path of flow of gas between said inlet and outlet, a plurality of ports peripherally disposed in a row about the bore of said socket for communication between said socket and outlet, an inlet port between said inlet and bore of said socket, a main rotatable plug in said socket having a recess for registration with said ports whereby said plug may be angularly disposed either to block said inlet port or to open said inlet port to said recess and to progressively place said outlet ports in communication with said recess and thereby with said inlet; an electromechanical step by step mechanism for rotating said main plug comprising a stem having a toothed wheel of metal with four ratchet teeth extending radially and two single contact teeth extending laterally in opposite directions and disposed between successive ratchet teeth and a pair of contact teeth extending laterally in opposite directions disposed intermediate succeeding ratchet teeth so that said single contact teeth and said pair of contact teeth will be advanced in seriatim, a reciprocable plunger and pawl engaging said ratchet teeth, an electromagnetic device to move said plunger, a pair of brush contacts disposed on opposite sides of said wheel for engagement by said contact teeth, said wheel being electrically connected to one electrical terminal and each of said brush contacts being electrically connected to separate terminals.

9. In a valve structure for the control and passage of fluids, a casing having an inlet port and a plurality of outlet ports, one of said outlet ports being in line and of the same area of said inlet port, a plug socket located at one side of the longitudinal center of the alined ports, a rotary plug located in said socket having a portion of its body removed to form a passage for fluids and means to rotate said plug step by step to bring said passage in communication successively between said inlet port and each of said outlet ports.

10. In a valve structure for the control and passage of fluids, a casing having an inlet port and a plurality of outlet ports, one of said outlet ports being in line and of the same area of said inlet port, a plug socket located at one side of the longitudinal center of the alined ports, a rotary plug located in said socket, said plug having a portion of its body removed to form a passage for fluids, means to adjust the flow of fluid through two of said outlet ports, and means to rotate said plug step by step to bring said passage in communication successively between said inlet port and each of said outlet ports.

TRACY B. RYON.